(12) United States Patent
Freeman et al.

(10) Patent No.: US 10,843,973 B2
(45) Date of Patent: Nov. 24, 2020

(54) INORGANIC FIBRE COMPOSITIONS

(71) Applicant: Morgan Advanced Materials PLC, Windsor (GB)

(72) Inventors: Craig Freeman, Wirral Merseyside (GB); David Thomas, Wirral Merseyside (GB); Thomas English, Wirral Merseyside (GB)

(73) Assignee: Morgan Advanced Materials PLC, Windsor (GB)

( * ) Notice: Subject to any disclaimer, the term of this patent is extended or adjusted under 35 U.S.C. 154(b) by 60 days.

(21) Appl. No.: 16/337,971

(22) PCT Filed: Sep. 29, 2017

(86) PCT No.: PCT/GB2017/052939
§ 371 (c)(1),
(2) Date: Mar. 29, 2019

(87) PCT Pub. No.: WO2018/060734
PCT Pub. Date: Apr. 5, 2018

(65) Prior Publication Data
US 2020/0039889 A1 Feb. 6, 2020

(30) Foreign Application Priority Data

Sep. 30, 2016 (GB) .................................. 1616662.1

(51) Int. Cl.
| | | |
|---|---|---|
| *C04B 35/622* | (2006.01) | |
| *C04B 35/624* | (2006.01) | |
| *C04B 35/634* | (2006.01) | |
| *C04B 111/00* | (2006.01) | |
| *C04B 111/52* | (2006.01) | |
| *C04B 111/76* | (2006.01) | |

(52) U.S. Cl.
CPC ...... *C04B 35/62236* (2013.01); *C04B 35/624* (2013.01); *C04B 35/63416* (2013.01); *C04B 35/63488* (2013.01); *C04B 2111/00362* (2013.01); *C04B 2111/52* (2013.01); *C04B 2111/763* (2013.01); *C04B 2235/3206* (2013.01); *C04B 2235/3208* (2013.01); *C04B 2235/3213* (2013.01); *C04B 2235/3217* (2013.01); *C04B 2235/3418* (2013.01)

(58) Field of Classification Search
CPC ... C03C 13/00; C03C 13/06; C04B 35/62227; C04B 35/44; C04B 35/62236; C04B 35/62245; C04B 35/622; C04B 35/624; C04B 35/6281; C04B 35/62813; C04B 2235/3217; C04B 35/63488; C04B 2235/3418; C04B 2235/3206; C04B 2235/3208; C04B 2235/3213; C04B 2235/5224; C04B 2235/5228
See application file for complete search history.

(56) References Cited

U.S. PATENT DOCUMENTS

| | | |
|---|---|---|
| 2007/0054697 A1 | 3/2007 | Wainwright et al. |
| 2009/0130937 A1 | 3/2009 | Wainwright et al. |

FOREIGN PATENT DOCUMENTS

| | | | |
|---|---|---|---|
| CN | 101356129 A | 1/2009 | |
| GB | 2534410 A | 7/2016 | |
| WO | WO-2007054697 A1 * | 5/2007 | ....... C04B 35/62236 |

OTHER PUBLICATIONS

International Search Report in PCT/GB2017/052939, 3 pages.
CN101356129B machine translation of Abstract and Claims by EPO, 3 pages.
UKIPO Combined Search & Examination Report in GB Appln No. 1616662, 2 pages.
Written Opinion of the International Searching Authority in PCT/GB2017/052939, 6 pages.

* cited by examiner

*Primary Examiner* — Elizabeth A. Bolden
(74) *Attorney, Agent, or Firm* — Servilla Whitney LLC

(57) ABSTRACT

A sol is provided for the production of inorganic fibres comprising precursors for aluminium oxide, silicon oxide, strontium oxide, wherein the precursors are present in proportions suitable to yield inorganic fibres having a composition comprising: $70 \leq Al_2O_3 \leq 80$ wt %; $10 \leq SiO_2 \leq 20$ wt %; $10 \leq SrO \leq 20$ wt % wherein the sum of $Al_2O_3$, $SiO_2$ and SrO is at least 95 wt %.

16 Claims, 6 Drawing Sheets

INORGANIC FIBRE COMPOSITIONS

CROSS-REFERENCE TO RELATED APPLICATIONS

This application is the National Stage entry of PCT/GB2017/052939, filed on Sep. 29, 2017, which claims priority United Kingdom Appln. Ser. No. 1616662.1, filed on Sep. 30, 2016, which are incorporated herein by reference in their entireties.

FIELD OF THE INVENTION

This invention relates to inorganic fibre compositions, and in particular to alkaline earth aluminosilicate fibres. The invention is also concerned with sol-gel processes for producing such fibres, and the use of such fibres in support structures for catalyst bodies in pollution control devices such as automotive exhaust system catalytic converters and diesel particulate filters.

BACKGROUND

Fibrous materials are well known for their use as thermal and/or acoustic insulating materials and are also known for their use as strengthening constituents in composite materials such as, for example, fibre reinforced cements, fibre reinforced plastics, and as a component of metal matrix composites. Such fibres may be used in support structures for catalyst bodies in pollution control devices such as automotive exhaust system catalytic converters and diesel particulate filters and may be used in the catalyst bodies themselves. Such fibres may be used as a constituent of friction materials [e.g. for automotive brakes]. The fibres of the present invention have a range of properties and may be usable in any or all of these applications depending on the properties shown.

WO 2007/054697 discloses inorganic fibres having a composition comprising a refractory base composition comprising silica and alumina and an additional component selected from alkaline earth metal oxides, alkali metal oxides, and mixtures thereof. The fibres disclosed therein exhibit a low shrinkage at elevated temperature, and a high resilience at temperature, and also have the virtue of having a degree of solubility in body fluids which is significantly higher than the solubility of pure mullite fibres. As described in said document, there is a trade-off in these requirements, with the invention disclosed therein permitting the production of highly refractory-slightly soluble materials at one extreme to very soluble-reasonably refractory materials at the other with a range of characteristics in between.

Due to public health concerns surrounding inhaled fibres, governments and regulators are adopting measures to discourage or even ban the use of fibres below a certain level of biosolubility. Consequently, there is a pressing need to find fibres with improved mechanical properties and improved biosolubility so that high-resilience materials can be utilised without falling foul of regulatory restrictions.

In particular, there is a need for fibres which can retain said mechanical properties in high-temperature applications.

SUMMARY OF THE INVENTION

The applicants have discovered a particular range of sol-gel fibres which may yield both improved biosolubility and mechanical strength for applications taking place up to 900° C., or even 950° C., or even above 950° C., said temperatures being useful for certain automotive applications of inorganic fibres such as in support mats for catalytic converters.

In particular, the applicant has assessed the use of fibres comprising alumina, silica, and various alkaline earth metal oxides in various proportions, and discovered unexpectedly that fibres comprising alumina, silica, and strontium oxide can provide surprisingly high levels of biosolubility and excellent mechanical properties in high temperature applications. In addition, the applicant has discovered how various optimisations can be made in order to improve either mechanical properties or biosolubility or both.

Accordingly, in a first aspect, the present invention provides a sol for the production of inorganic fibres, the sol comprising precursors for aluminium oxide, silicon oxide, and strontium oxide, wherein the precursors are present in proportions suitable to yield alkaline earth aluminosilicate fibres having a composition comprising:

A. $70 \leq Al_2O_3 \leq 80$ wt %;
B. $10 \leq SiO_2 \leq 20$ wt %;
C. $10 \leq SrO \leq 20$ wt %; and
D. $0 \leq CaO < 4$ wt %
wherein the sum of $Al_2O_3$, $SiO_2$ and SrO is at least 90 wt %, or at least 92 wt %, or at least 94 wt %, or at least 95 wt %, or at least 96 wt %, or at least 98 wt %, or at least 99 wt %, or at least 99.5 wt %, or at least 99.9 wt %.

The sol preferably further comprises a polymer for controlling the viscoelasticity of the sol. The polymer is preferably polyethylene oxide (PEO) and/or polyvinyl alcohol, although other polymers capable of controlling the viscoelasticity of the sol may also be used. The molecular weight of the polymer is preferably at least 100,000, more preferably at least 200,000 and even more preferably at least 300,000. The molecular weight of the polymer is preferably no more than 20,000,000, more preferably no more than 10,000,000 and even more preferably no more than 7,000,000. Polymers above this molecular weight range may become too viscose to disperse into the sol.

It has been found that a blend of a lower MW polymer (e.g. less and 1,000,000) with a higher MW polymer (e.g. greater than 1,000,000) may advantageously improve the properties of the resultant fibres formed from the sol. The ratio of the low MW polymer to the high MW polymer is preferably in the ratio of 100 parts low MW polymer: between 0.1 to 10 and more preferably between 1 to 5 parts high MW polymer.

The proportion of the polymer in the sol is preferably between 0.5 wt % and 10 wt % and more preferably between 1.0 wt % and 7.0 wt %.

In a second aspect of the present invention there is provided alkaline earth aluminosilicate fibres having a composition comprising:

A. $70 \leq Al_2O_3 \leq 80$ wt %;
B. $10 \leq SiO_2 \leq 20$ wt %;
C. $10 \leq SrO \leq 20$ wt %; and
D. $0 \leq CaO < 4$ wt %
wherein the sum of $Al_2O_3$, $SiO_2$ and SrO is at least 90 wt %, or at least 92 wt %, or at least 94 wt %, or at least 95 wt %, or at least 96 wt %, or at least 98 wt %, or at least 99 wt %, or at least 99.5 wt %, or at least 99.9 wt %.

The composition preferably further comprises $0 \leq MgO \leq 4$ wt % and more preferably comprises $\leq 2$ wt % MgO. Small amounts of MgO have been found to increase biosolubility in at least some embodiments.

It has been found that the claimed composition provides an improved balance of mechanical and biosolubility properties.

The proportion of alkaline earth oxides (including SrO, MgO and CaO) is preferably no more than 20 wt % and more preferably no more than 15 wt %. Higher alkaline earth oxides levels may result in a deterioration in mechanical and/or biosolubility properties.

In a preferred embodiment the composition is substantially free of MgO and CaO. In another embodiment the combined MgO and CaO is less than 8 wt %, preferably less than 4 wt % and more preferably less than 2 wt %.

Fibres having a composition of the present invention preferably have a static biosolubility level, according to the test described herein, of at least 20 ppm, more preferably at least 90 ppm, even more preferably at least 150 ppm and yet even more preferably at least 200 ppm.

Fibres having a composition of the present invention preferably have a 900° C. cyclic compression performance, according to the test described herein, of at least 20 kPa, more preferably at least 50 kPa, more preferably at least 80 kpa and even more preferably at least 100 kPa.

There is typically a trade-off in performance, with fibres comprising relatively high static biosolubility levels typically exhibiting relatively low cyclic compression performance results. However, compositions may be adjusted to achieve the desired balance of mechanical and biosolubility performance.

In a third aspect of the present invention, there is provided a method of producing sol-gel fibres comprising:—
A. the formation of a sol as described in the first aspect of the present invention
B. forming fibres from the sol
C. firing the resultant fibres at a temperature in excess of 900° C. to produce fibres as described in the second aspect of the present invention.

In a fourth aspect of the present invention, there is provided inorganic fibres, preferably alkaline earth aluminosilicate fibres, comprising a static biosolubility level of at least 90 ppm and a cyclic compression at 900° C. of at least 20 kPa. The fibres preferably comprise SrO. More preferably, the alkaline earth aluminosilicate fibres dissolution rate of at least 150 ng/cm$^2$/hr and more preferably at least 250 ng/cm$^2$/hr as determined according to the test described herein.

The scope of the claimed invention is further set out in the claims, and the scope thereof is incorporated into this description by reference.

Further features of the invention are as set out in the appended claims and exemplified in the following description.

DETAILED DESCRIPTION

For the avoidance of doubt it should be noted that in the present specification the term "comprise" in relation to a composition is taken to have the meaning of include, contain, or embrace, and to permit other ingredients to be present. The terms "comprises" and "comprising" are to be understood in like manner. It should also be noted that no claim is made to any composition in which the sum of the components exceeds 100%.

Where a patent or other document is referred to herein, its content is incorporated herein by reference to the extent permissible under national law.

Further it should be understood that usage in compositions of the names of oxides [e.g. alumina, silica, quicklime, calcia, strontia] does not imply that these materials are supplied as such, but refers to the composition of the final fibre expressing the relevant elements as oxides. The materials concerned may be provided in whole or in part as mixed oxides, compounded with fugitive components [e.g. supplied as carbonates] or indeed as non-oxide components [e.g. as halides].

To prove the concept of the invention, a number of compositions were made by forming various aluminosilicate compositions comprising strontium oxide as an additive. Except for such differences as highlighted below, the manufacturing method was similar to that of the fibres disclosed in PCT application no. WO 2007/054697. The precursors used were composed of a base sol to which was added precursors for the desired alkaline earth. An aluminium chlorohydrate was used as the source of alumina. A mixture of siloxane and colloidal silica sol acted as a source of silica. The precursors used for the preparation of the base sol for the production of the fibre in the present invention can be accomplished by other conventional methods known in the art. These include the use of inorganic oxy compounds, alkoxides, and chlorides.

The invention is not limited to any particular method of forming the fibres from the sol, and other methods [e.g. rotary or centrifugal formation of fibres; drawing; air jet attenuation; electrospinning] may be used. The compositions described herein and other alkaline earth aluminosilicate fibres may also be made by melt methods, and such fibres may avoid problems that flow from formation by a sol-gel route.

Strontium oxide used to alter the properties of the sol-gel formed fibres according to the present invention was included by adding soluble salts in the sol precursor. These include salts such as chlorides or nitrates [e.g strontium nitrate].

The process used experimentally involved a fibre blowing system where sol is forced through small orifices (typically ~0.3 mm) using pressure generated using compressed or pressurised air. Surrounding each orifice is a shroud of air to dry and draw the fibres. Alternative methods which may be use to produce sol-gel fibres include:
   Sol is extruded through 300×0.2 mm holes spaced evenly around the periphery of a disc rotating at 2600 r.p.m. Air at 15° C. and 45% relative humidity is blown through an annular orifice past the disc to attenuate the sol streams. Hot air at 160-200° C. is blown through a further annular orifice outside the fiberising air annular orifice to dry the sol streams into green fibre.

A spinning disc of a closed cup design with rows of holes around the circumference (typically ~0.5 mm diameter), the sol being fed to the spinner through the shaft.

Feeding a liquid sol onto a rapidly spinning shallow cup having inclined sides. Fiberisation has been demonstrated from 3,000 rpm up to 15,000 rpm.

The applicant previously used a method in which sol was ejected from the lip of the cup by centrifugal force, forming thin streams of material. As the ejected material left the cup it passed through a stream of hot air which dried and gelled the sol to form an unfired fibre. The temperature of this air was measured using a thermocouple positioned in the hot air flow just above the spinning cup. The air temperature used for the majority of examples was ~60° C. Some sols were fiberised using drying air up to ~80° C. The air temperature needs to be selected to meet the viscosity and drying characteristics of the sol and the additives present. Typically temperatures of 30° C. to 150° C. may be used as appropriate. Any other suitable means for drying the fibre may be employed, for example, by circulating dehumidified air or gas around the fibre.

The applicant presently uses a process in which sol is extruded through 0.4 mm diameter holes with a spacing of 3 mm using compressed air to provide back pressure. The liquid streams are then attenuated by airstreams either side of the sol streams and broadly parallel with them.

The air streams are at a distance of 1 mm from the sol streams. The air pressure used is 0.1 bar and the resultant air velocity about 120 m/s. The air is humidified and cooled to maintain 25-35° C. and a relative humidity of between 45 and 65%. The chamber into which the sol streams are attenuated is kept at a temperature of between 90 and 100° C. measured at a distance 500 mm from the fiberising heads.

It has been discovered that the process of drying the fibres can have a significant effect on their subsequent physical properties. In the event fibres are not properly dried on emergence, "kinks" can appear in the fibres produced and mechanical resilience suffers accordingly. Beneficially, it has been discovered that the spacing of the fibre streams involved has an effect on drying; a 3 mm spacing between nozzles/holes/orifices/points of origin for fibre streams can ensure that sufficient airflow exists to allow for proper drying.

The fibres were collected in alumina kiln trays and heat treated by placing the tray in a kiln and firing. Superior results were obtained when the fibres were fired at 900° C. for an hour, allowed to cool, and subsequently fired at 1050-1250° C. (usually 1150° C.) for an hour (with a 100° C./hr ramp rate). As an alternative, the fibres can also be fired through a tunnel kiln with a peak temperature up to 1250° C. over a time period of up to 12 hours. Both of these firing methods have the beneficial effect of controlling the level of crystallisation in the fibres, and in particular the ratio of strontium aluminosilicate ($Sr(Al_2Si_2O_8)$) crystals and alumina crystals ($\eta$, $\theta$ and $\gamma$) to amorphous material in the fibres. Controlling crystallisation ensures the correct balance between resilience and biosolubility of the fibres required for automotive applications can be achieved.

Example Fibres

Figure 1:
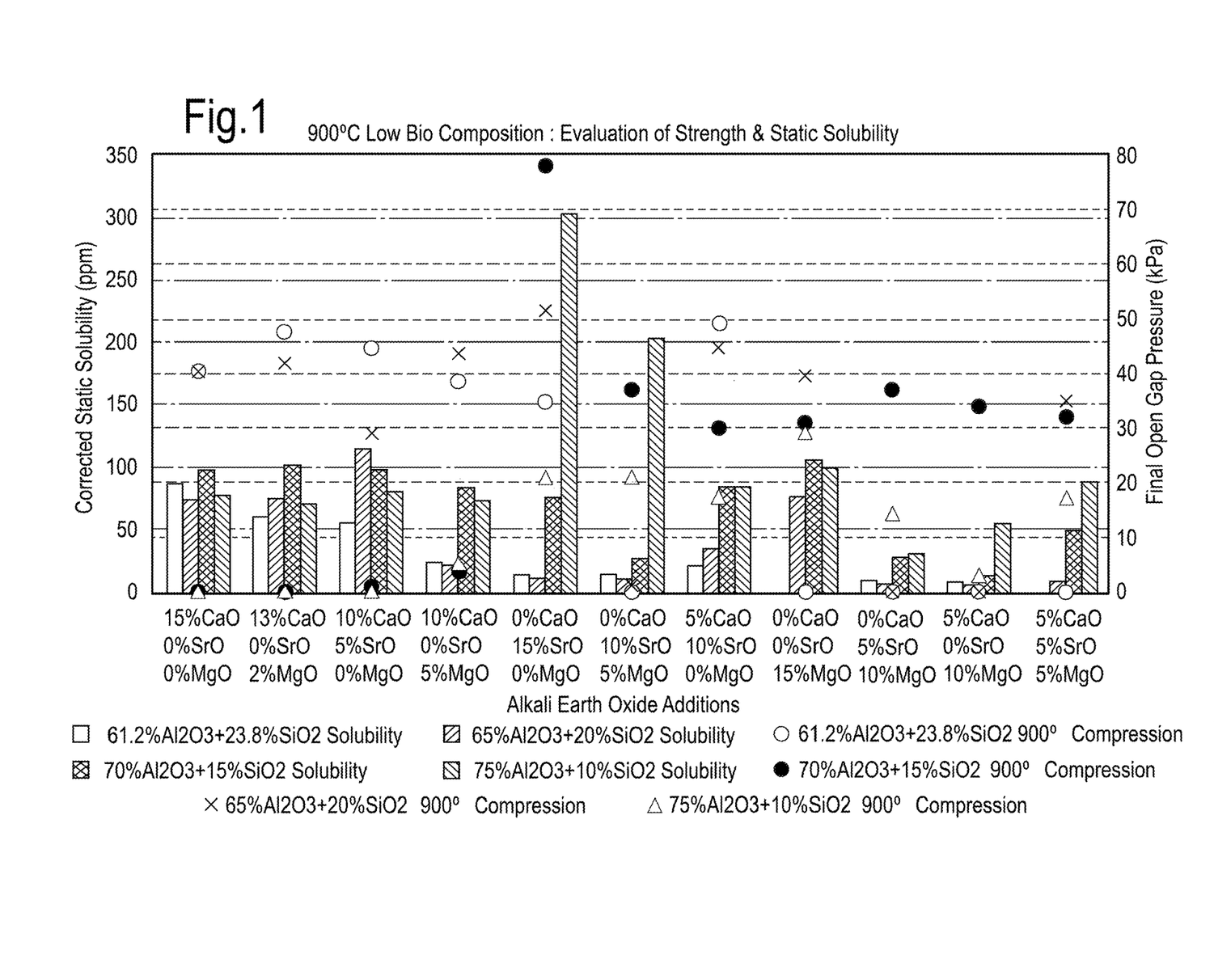
FIG. 1 depicts evaluation of strength and static solubility of a range of aluminosilicate fibres incorporating alkaline earth metal oxides.

The applicants have investigated a range of fibres to determine the effect of calcia, magnesia, strontia, and total amount of silica and alumina on properties. FIG. 1 depicts various results of tests on a range of formulations. It will be noted that in cyclic compression tests (as described below), the best results were achieved with a fibre comprising 70 wt % alumina, 15 wt % silica, and 15 wt % SrO; likewise, in solubility tests (as described below) the best results were achieved in a fibre comprising 75 wt % alumina, 10 wt % silica, and 15 wt % SrO. Only those two formulas in FIG. 1 represent fibres according to the present invention; the rest are all comparative examples.

Subsequent tests found fibres with unexpectedly high solubilities and compression strengths within the formulation ranges of interest (70-80 wt % alumina, 10-20 wt % silica, 10-20 wt % SrO). In the process.

To balance the requirements of biosolubility and mechanical resilience for fibres intended for applications up to 900° C., 950° C., or beyond, a typical compositional range might be:—

$70 \leq Al_2O_3 \leq 80$ wt %;
$10 \leq SiO_2 \leq 20$ wt %;
$10 \leq SrO \leq 20$ wt %; and
$0 \leq CaO < 4$ wt % and preferably $0 \leq MgO \leq 4$ wt %

It can be that the proportion of $Al_2O_3$ is at most 77.5 wt %. It can be that the proportion of $Al_2O_3$ is at least 72 wt %. It can be that the proportion of $Al_2O_3$ is 72.0±2.0 wt %, preferably 72.0±1.0 wt % and more preferably 72.0±0.1 wt %.

It can be that the proportion of $SiO_2$ is at least 11 wt %. It can be that the proportion of $SiO_2$ is at most 15 wt %. It can be that the proportion of $SiO_2$ is 14.0±2.0 wt %, preferably 14.0±1.0 wt % and more preferably 14.0±0.1 wt %.

It can be that the proportion of SrO is at least 12.5 wt %. It can be that the proportion of SrO is at most 15 wt %. It can be that the proportion of SrO is 14.0±2.0 wt %, preferably 14.0±1.0 wt % and more preferably 14.0±0.1 wt %.

It can be that the proportion of CaO is less than 2 wt %. It can be that the proportion of CaO is 0 wt %.

In the case of most of the fibres the source of silica in the sol gel consisted of a 50:50 mixture by mass of siloxane and colloidal silica, the colloidal silica in question being marketed under the brand name "Ludox CL" ® (30 wt % suspension of silica in water, pH 4.5). The sol-gel also comprises a number of additives which are typically not found in the resultant fibres. In particular, a polymer material is added in a small quantity to the sol-gel so that when pumped through nozzles or extruded in sol-gel fibre production processes the sol will fiberize as opposed to simply spraying.

TABLE 1

A summary of raw materials and operating conditions used when generating the samples tested containing combinations of SrO, MgO and CaO.

| | |
|---|---|
| Raw Materials Used in Sol | Aluminium Chlorohydrate (ACH) Powder, ACH Solution, Ludox CL (RTM), Siloxane, PEO (MW: 300 000) (RTM), Strontium Nitrate, Calcium Nitrate Tetrahydrate, Magnesium Nitrate |
| Amount of Polymer Added (PEO (MW: 300 000)) | 1 wt % by weight of sol |
| Solids Content of Sol (% Oxides) | 25 wt %-28 wt % by weight of sol |
| Viscosity of Sol (centipoises) (at 22° C.) | 1200-5400 cPs |
| Sol Flow Rate (g/nozzle/hr) | 12 (±3) |
| Fiberising Unit Temperature | ~35° C. |
| Woolbin Temperature | ~100° C. |
| Shroud Pressure | 0.100 bar |

Table 1 provides a summary of the manufacturing conditions utilised in producing the fibres whose test results are depicted in FIG. 1 (said fibres were fired at a temperature of 1100° C.). Note that though a certain weight percentage of the sol is accounted for by the polymer, traces of the polymer are typically not found in the inorganic fibres produced from the sol because the polymer is burned out during the firing process, whose composition is based on the proportions of oxide precursors used in the sol.

Comparative fibres and fibres according to the present invention were assessed on mechanical resilience through a hot cyclic compression test, in which the materials were subjected to cyclic compression between two different pressures at 900° C. and the retained force measured; the more force retained, the more resilient the material. Static solubility (normalised and otherwise) and flow through solubility measurements were also made in accordance with the procedure set out in WO2008/065363, save that the test proceeded for 24 hours instead of 5 hours due to the lower solubility of the fibres involved.

Table 2 summarises a range of example fibres of the present invention and a comparative fibre, all made according to the parameters set in table 1 save for the firing temperature, which was varied. Table 2 providing their compositions as well as firing temperature shot content and the results of the solubility and cyclic compression tests. (To measure shot, content, 10-25 g of fibre was crushed 3 times in a 64 mm diameter die at a pressure of 10 MPa, stirring between crushes. 10 g of the crushed fibres was placed on a 53 μm sieve and sucked through the jet air sieve for 180 seconds. Material remaining in the sieve was considered to be shot and weighed to assess the shot content by weight percentage.) Higher shot content appears to correlate with diminished mechanical resilience. Shot content can be less than 6 wt %, or less than 2 wt %, or even less than 1.5 wt %.

It is evident that even when the sol composition is essentially the same, the solubility and compressive strength may vary depending on firing temperature and shot content. For instance, in comparing sample 1477 and sample 1483 it may be noted that the two samples have an identical composition and extremely low shot content, and perform almost identically on the cyclic compression tests as a result of a mere 50° C. difference in firing temperature—the higher firing temperature for 1477 causing a greater extent of crystallisation and thus a reduction in solubility. Thus, a certain amount of optimisation may take place of individual compositions by controlling firing temperature and aiming to minimise shot content (and/or rejecting batches with an unacceptable level of shot content). It is clear from the data shown below that the ideal temperature range for firing these fibres is between 1100° C. and 1300° C., and more preferably between 1150° C. and 1250° C. Samples 1270 and 1271 demonstrate the effect of the firing temperature on the static solubility of the fibres, with a firing temperature of 1200° C. resulting in improved static solubility relative to a firing temperature of 1300° C.

It is also evident that when modifying the biopersistence of the fibre by adding strontia, the ratio of alumina to silica making up the remaining component of the fibre contributes to the trade-off between static solubility and performance in the 900° C. cyclic compression tests. For instance, when fibres are comprised of 15 wt % strontia are fired to 1100° C., a fibre comprising 75 wt % alumina (1119) has good performance in static solubility but poor performance in 900° C. cyclic compression testing, conversely a fibre comprising 70 wt % alumina (1059) has very good performance in 900° C. cyclic compression testing but poor performance in static solubility testing. Similarly, when the fibre contains 14 wt % strontia, a sweet spot for both cyclic compression and static solubility performance emerged in the sample 1449, compared to 1552, 1503 and 1469 which have worse performance in 900° C. cyclic compression testing.

TABLE 2

Table of example fibres and comparative fibres.

| Sample | Al2O3 (wt %) | SiO2 (wt %) | SrO (wt %) | Firing Temperature (° C.) | Shot Content (wt %) | Static Solubility [ppm] | 900° C. Cyclic Compression - Final Open Gap Pressure (0.368 g/cm3) [kPa] |
|---|---|---|---|---|---|---|---|
| 1131 (Comparative) | 65 | 20 | 15 | 1100 | 0.5 | 10.2 | 35 |
| 1487 | 70 | 17 | 13 | 1200 | 0.48 | 21.38 | |
| 1059 | 70.0 | 15 | 15 | 1100 | 1.2 | 73.48 | 78 |
| 1270 | 70 | 15 | 15 | 1200 | 2.3 | 55.1 | 50 |
| 1271 | 70 | 15 | 15 | 1300 | 2.3 | 6.71 | |
| 1545 | 70 | 12.5 | 17.5 | 1200 | 4.47 | 121.2 | 27 |
| 1490 | 71 | 16 | 13 | 1200 | | 62.41 | |
| 1552 | 71 | 15 | 14 | 1150 | 0.33 | 120.85 | 69 |
| 1449 | 72 | 14 | 14 | 1150 | 1.14 | 94 | 82 |
| 1493 | 72 | 13 | 15 | 1150 | 0.75 | 216.49 | |
| 1475 | 72 | 13 | 15 | 1200 | 0.8 | 169.77 | 39 |
| 1541 | 72.5 | 10 | 17.5 | 1200 | 2.51 | 73.5 | 26 |
| 1503 | 73 | 13 | 14 | 1150 | 0.9 | 164.00 | 54 |
| 1416 | 73 | 13 | 14 | 1150 | 4.2 | 36.02 | 30 |
| 1457 | 73 | 13 | 14 | 1200 | 0.8 | 60.54 | 53 |
| 1492 | 73 | 12 | 15 | 1150 | 0.58 | 272.10 | |
| 1472 | 73 | 12 | 15 | 1200 | 0.6 | 195.05 | 37 |
| 1442 | 74 | 13 | 13 | 1200 | 1.9 | 104.54 | 66 |
| 1418 | 75 | 12.5 | 12.5 | 1150 | 2.3 | 84.90 | 60 |
| 1502 | 75 | 12.5 | 12.5 | 1150 | 3.2 | 172.00 | 55 |
| 1460 | 75 | 12.5 | 12.5 | 1200 | 1.2 | 65.27 | 35 |
| 1119 | 75.0 | 10 | 15 | 1100 | 0.07 | 307.29 | 22 |
| 1491 | 76 | 11 | 13 | 1150 | | 222.50 | 46 |

TABLE 2-continued

Table of example fibres and comparative fibres.

| Sample | Al2O3 (wt %) | SiO2 (wt %) | SrO (wt %) | Firing Temperature (° C.) | Shot Content (wt %) | Static Solubility [ppm] | 900° C. Cyclic Compression - Final Open Gap Pressure (0.368 g/cm3) [kPa] |
|---|---|---|---|---|---|---|---|
| 1463 | 76 | 11 | 13 | 1200 | 0.9 | 202.04 | 28 |
| 1479 | 76 | 10 | 14 | 1150 | 0.1 | 219.06 | 32 |
| 1469 | 76 | 10 | 14 | 1200 | 1.5 | 332.18 | 23 |
| 1477 | 77 | 10 | 13 | 1200 | 0.5 | 73.54 | 39 |
| 1483 | 77 | 10 | 13 | 1150 |  | 278.75 | 40 |
| 1466 | 77 | 10 | 13 | 1200 | 1.0 | 235.00 | 23 |

Variants

The present invention does not preclude the presence of other components, for example:—
- alkaline earth metals other than calcium and strontium may be present
- alkali metals may be present
- transition metals and lanthanide elements may be present and although the claims are expressed in terms of oxides, halide components may also be present. (For instance, very small levels of chlorine or nitrates may remain if not burned out during the firing process.)

Optimisation of Fibres

To obtain superior fibre properties for some applications it may be necessary to optimise fibres of the present invention. Said optimisation may arise from suitable selection of firing temperature, sol flow rate, viscosity, and other aspects of the fiberisation process. Optimisation may also arise from selecting appropriate additives to go into the sol alongside the oxide precursors. For some purposes, optimisation may involve raising solubility as high as possible. For some purposes, optimisation may involve raising compression strength (as measured as open gap pressure in cyclic compression tests between 500° C. and 950° C.) as high as possible. For some purposes, optimisation may involve getting compression strength (as measured as open gap pressure in cyclic compression tests at 900° C.) as close to 80 kPa open gap pressure as possible whilst keeping solubility (as measured in the tests described above) above 100 ppm.

One modification which may be made to the sol in order to optimise properties is to change the quantity or type of polymer added to the sol. Polymers are added to sols in sol-gel fibre production as a means of controlling the viscoelasticity of the sol, which in turn affects fiberisation (viscoelasticity may be affected both by the amount of polymer added and the molecular weight of the polymer in question).

Table 3 illustrates how merely using 1.2 wt % Polyethylene oxide (PEO) (Trade name; Polyox N750, reported molecular weight: 300 000)® in the production of fibres instead of 1 wt % PEO (MW: 300 000)® can affect the properties of fibres. All fibres in Table 3 are otherwise made according to the above outlined method and the parameters in Table 1; the precursors were chosen so as to yield fibres with a composition of 73 wt % alumina, 13 wt % silica, and 14 wt % SrO.

TABLE 3

Table comparing fibres with differing polymer additives in sol.

| Sample Number | Polymer (% wt of sol) | Firing Temperature (° C.) | Shot Content >53 μm | Static Solubility [ppm] | 900° C. Cyclic Compression - Final Open Gap Pressure (0.368 g/cm3) [kPa] |
|---|---|---|---|---|---|
| 1503 | 1 wt % PEO (MW: 300 000) (RTM) | 1150 | 0.9 | 164.00 | 54 |
| 1416 | 1 wt % PEO (MW: 300 000) (RTM) | 1150 | 4.2 | 36.02 | 30 |
| 1351 | 1.2 wt % PEO (MW: 300 000) (RTM) | 1150 | 5.7 | 141.09 | 35 |
| 1457 | 1 wt % PEO (MW: 300 000) (RTM) | 1200 | 0.8 | 60.54 | 53 |
| 1344 | 1.2 wt % PEO (MW: 300 000) (RTM) | 1200 | 5.7 | 51.90 | 47 |
| 1352 | 1.2 wt % PEO (MW: 300 000) (RTM) | 1250 | 5.7 | 136.60 | 35 |

TABLE 4

Table comparing fibres with differing polymer additives in sol.

| Sample | Polymer (all percentage based on wt % of sol) | Lab Kiln Max Temperature (° C.) | Shot Content >53 μm | Static Solubility [ppm] | 900° C. Cyclic Compression - Final Open Gap Pressure (0.368 g/cm3) [kPa] |
|---|---|---|---|---|---|
| 1274 | 1.2% PEO (MW: 300 000) (RTM) | 1100 | 1.1 | 128.24 | 32 |
| 1331 | 1.2% PEO (MW: 300 000) (RTM) | 1150 | 3.4 | 155.79 | 35 |
| 1328 | 1.2% PEO (MW: 300 000) (RTM) + 0.015% PEO (MW: 7 000 000) (RTM) | 1150 | 0.7 | 97.30 | 45 |
| 1332 | 1.2% PEO (MW: 300 000) (RTM) | 1200 | 3.4 | 178.72 | 29 |
| 1326 | 1.2% PEO (MW: 300 000) (RTM) + 0.015% PEO (MW: 7 000 000) (RTM) | 1200 | 0.7 | 55.73 | 49 |
| 1275 | 1.2% PEO (MW: 300 000) (RTM) | 1200 | 1.1 | 124.34 | 48 |
| 1329 | 1.2% PEO (MW: 300 000) (RTM) + 0.015% PEO (MW: 7 000 000) (RTM) | 1250 | 0.7 | 148.66 | 39 |
| 1276 | 1.2% PEO (MW: 300 000) (RTM) | 1300 | 1.1 | 12.58 | |

For instance, it will be noted comparing sample 1503 and sample 1416 where a sol with 1 wt % PEO (MW: 300 000)® was used, the properties of the resultant fibres were extremely sensitive to shot content, with a batch with an increased shot content showing a substantially reduced solubility, whereas in sample 1351 where 1.2 wt % PEO (MW: 300 000)® was used the solubility was increased. It will also be apparent from the above that the actual effect of additional PEO (MW: 300 000)® will vary somewhat based on the firing temperature of the fibre.

Adding a small amount of a polymer with a higher molecular weight, such as PEO (Trade name; Polyox 303, reported molecular weight: 7 000 000)®, may likewise have a significant effect on properties, as shown in Table 4. All fibres in table 4 included 1.2 wt % PEO (MW: 300 000)® in the sol and were otherwise made according to the above outlined method and the parameters in table 1; the precursors were chosen so as to yield fibres with a composition of 72.5 wt % alumina, 12.5 wt % silica, and 15 wt % SrO.

The applicant's tests have shown that not all compositions will be affected in the same way by the same modification to the sol or the manufacturing process, and that differences in performance are likely as a result of changes to the microstructure, surface area and porosity of the fibres which manifest themselves in altered solubility or strength. It is frequently the case in such optimisations that the solubility and compressive strength properties "trade off" against each other, meaning that an increase in one property usually (but not always) comes at a cost to the other property.

TABLE 5

A summary of modifications to the sol which may be of use in optimising fibres.

| Modification | Aim |
|---|---|
| 1.2 wt % PEO (MW: 300 000) (RTM) + 0.015 wt % PEO (MW: 7 000 000) (RTM) | Previous research demonstrated that using PEO (MW: 7 000 000) improved fiberisation and decreased shot content resulting in stronger fibres. Using a small amount of PEO (MW: 7 000 000) was identified as the optimum method of achieving this improvement without producing extremely coarse fibres, which would be weak. |
| 60:40 ratio of Colloidal Silica to Siloxane by weight | Previous research had demonstrated that the ratio of silica raw materials can affect the strength of the fibres. Both 40:60 and 60:40 of the respective raw materials were tested in one chemistry (see results in table 6 below) after improvement in solubility when 60% colloidal silica was used, it was decided to experiment with this ratio on all promising compositions, especially where solubility was considered low. |
| 0.5% Caldic (RTM) SP3300 | Caldic SP3300 (RTM) (a surfactant) has been used when manufacturing mullite fibres to improve fiberisation. |
| ±0.5% SrO (Dependant on solubility) | It was discovered that if a particular fibre composition's strength was high and solubility low (or vice-versa), small variations in the amount of SrO in the sol (whilst maintaining the ratio of alumina and silica) could provide a suitable means of "trading off" the two properties of the fibre against each other. |

Table 5 describes a particular set of modifications to the sol which may be of use in optimising fibres according to the present invention for particular uses.

Table 6 provides an example of how an otherwise simple difference in sol—in this case, varying the silica source—can lead to a substantial improvement in solubility, thus demonstrating how such modifications can allow for optimal results to be obtained.

TABLE 6

Example of differences in shot content and solubility arising from modifying proportion of silica sources in production of fibres with 75 wt % Al2O3, 12.5 wt % SiO2, and 12.5 wt % SrO (polymer used in sol was PEO (MW: 300 000), 1 wt % by weight of sol).

| Sample Number | Silica sources | Firing | Shot Content (%) | Solubility (ppm) | Hot Cyclic Compression (Final Open Gap 900° C.) |
|---|---|---|---|---|---|
| 1525 | 60% Siloxane 40% Ludox CL (RTM) by weight | 1200° C. | 1.48 | 64 | 30 |
| 1535 | 40% Siloxane 60% Ludox CL (RTM) by weight | 1200° C. | 2.57 | 175 | 28 |

Figure 2:
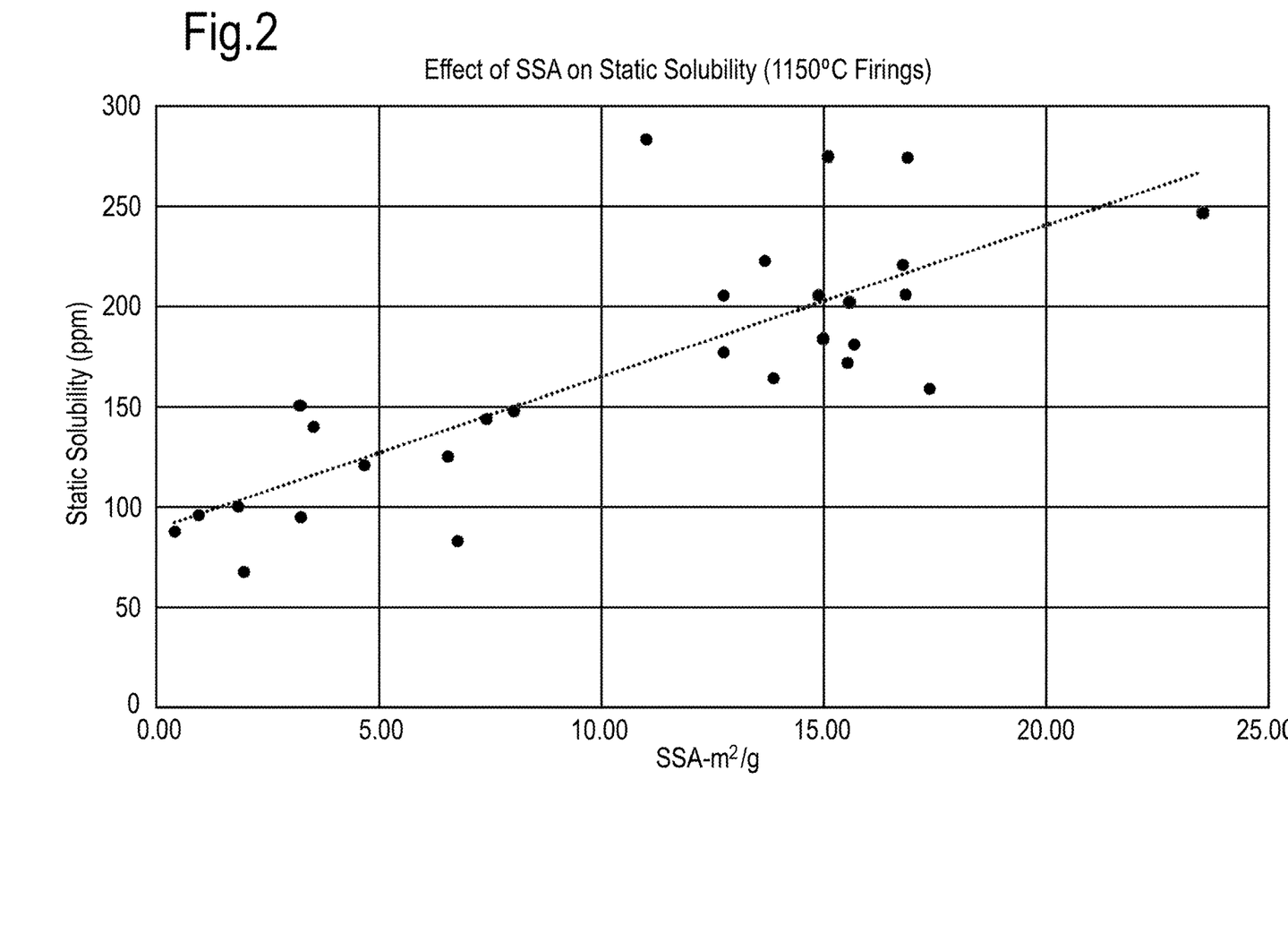
FIG. 2 depicts variation of solubility with specific surface area in fibres according to the present invention.
Figure 3:
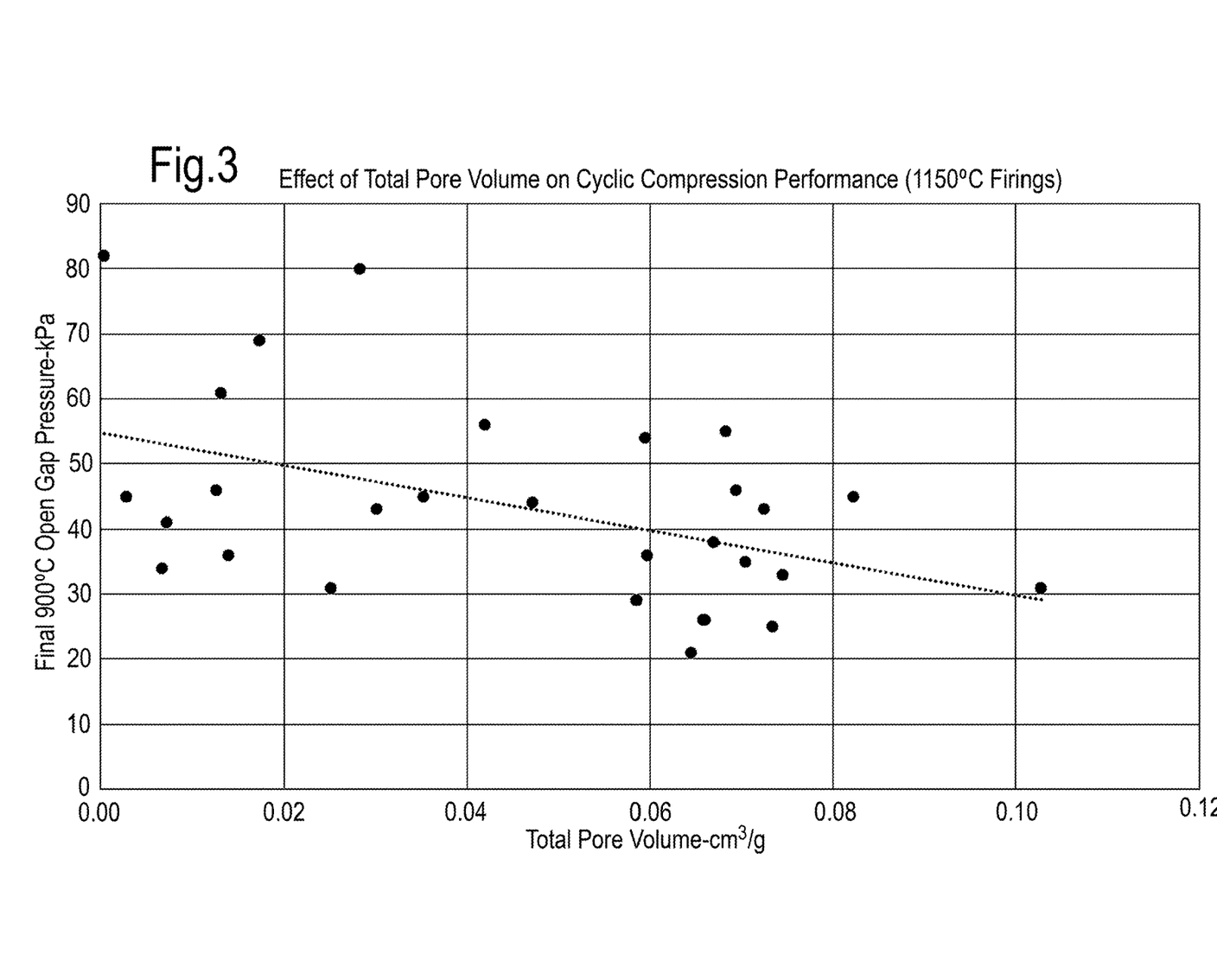
FIG. 3 depicts variation of cyclic compression test performance in fibres according to the present invention.

FIGS. 2 and 3 depict respectively variance in fibre solubility and cyclic compression test performance against the specific surface area of fibres as calculated via BET methods, showing a positive correlation for solubility and a negative for cyclic compression performance, using fibres produced using various different compositions and various different modification. (In compositions depicted alumina content of fibres ranged from 71 to 76 wt %, silica from 11 to 15 wt %, and strontian from 12.5 to 15 wt %). The correlation is strong for solubility but less so for cyclic compression performance, since the latter is also greatly affected by factors such as shot content and fibre diameter.

Figure 4:
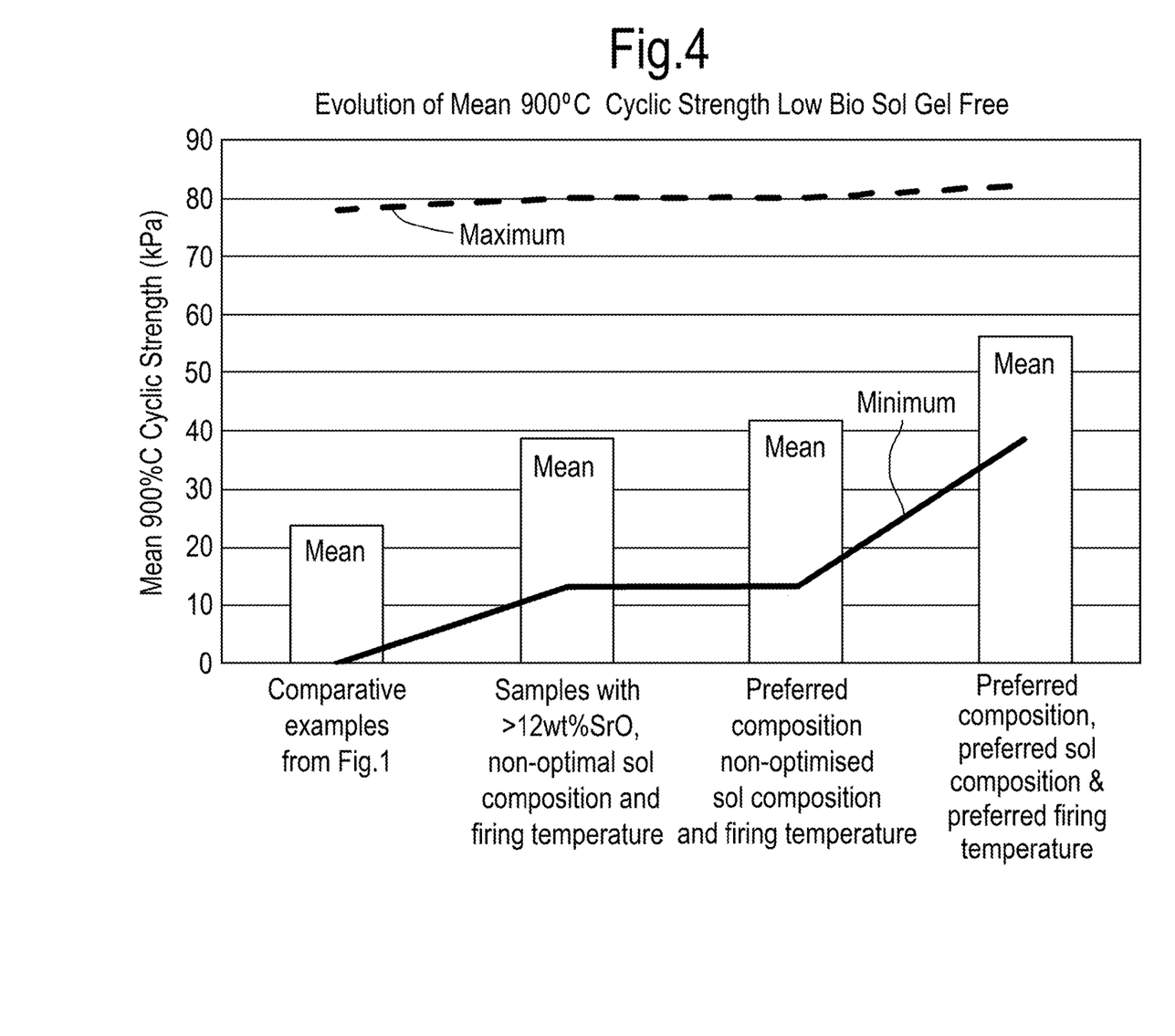
FIG. 4 depicts improvements to the minimum and mean cyclic compression test results of fibres, comparing comparative examples to various increasingly preferable embodiments of the present invention.

With optimisation of fibre composition, sol composition, and firing temperature, substantially more consistent and improved cyclic compression performance can be obtained. FIG. 4 compares results for the comparative examples depicted in FIG. 1, various fibres tested according to the present invention with a SrO content of above 12 wt % and a non-optimal fibre composition, non-optimised sol composition, and non-optimised firing temperature, fibres made according to a preferred composition of 72 wt % alumina, 14 wt % silica and 14 wt % SrO and non-optimised sol composition and firing temperature, and fibres made according to the preferred composition with a preferred sol composition with 1.2 wt % polyox 750 ® and 0.015 wt % PEO (MW: 7 000 000)® in the sol and the fibres fired at 1150° C. It will be particularly noted that whilst some increase in the maximum performance observed is obtained, the major increase is in the minimum and mean results, demonstrating that the various improvements provided in the present disclosure allow for far greater consistency in cyclic compression test performance.

Modification of Sol Using PVA

It is also possible to produce the precursor sol using polyvinyl alcohol instead of PEO as the polymer source. For this method, ACH powder is not used in the process and the silica source can be 100% colloidal silica, although this is not necessary. A typical sol would be mixed as follows:

1. Weigh ACH solution into a measuring cylinder
2. Weigh colloidal silica and slowly mix into the ACH solution.
3. Weigh Strontium Nitrate and slowly mix into the solution.
4. If siloxane is to be used, weigh the siloxane and slowly mix into the solution.
5. Mix a 5 wt % PVA solution with water and slowly mix into the sol.
6. Remove water from the sol by mixing at 50° C., once the viscosity of the sol reaches 1000 centipoises at 50° C. stop mixing and allow the sol to cool for fiberisation. The range of PVA concentration by wt % at this point is 1-3%. Around 60% of the starting weight of the sol would have been removed in order to achieve this.

TABLE 7

Table comparing fibres with differing polymer additives in sol.

| Sample | Polymer (all percentages based on wt % of sol) | Silica Source | Shot Content >53 μm | Static Solubility [ppm] | 900° C. Cyclic Compression - Final Open Gap Pressure (0.368 g/cm3) [kPa] |
|---|---|---|---|---|---|
| 1331 | 1.2% PEO (MW: 300 000) (RTM) | 50:50 Ludox CL (RTM):Siloxane | 3.4 | 155.79 | 35 |
| 1328 | 1.2% PEO (MW: 300 000) (RTM) + 0.015% PEO (MW: 7 000 000) (RTM) | 50:50 Ludox CL (RTM):Siloxane | 0.7 | 97.30 | 45 |
| 1817 | 1.5% Poval B-17 (RTM) | 50:50 Ludox CL (RTM):Siloxane | 0.47 | 168.50 | 58 |
| 1805 | 2.4% Poval B-17 (RTM) | Ludox CL (RTM) only | 3.57 | 156.99 | 28 |

Table 7 exemplifies the effect of utilising PVA and modifying the silica sources in sol preparation. All fibres in table 7 were fired at a temperature of 1150° C. and were otherwise made according to the above outlined method and the parameters in table 1; the precursors were chosen so as to yield fibres with a composition of 72.5 wt % alumina, 12.5 wt % silica, and 15 wt % SrO. The PVA source was Poval B-17®.

Performance of Fibres

Figure 5:
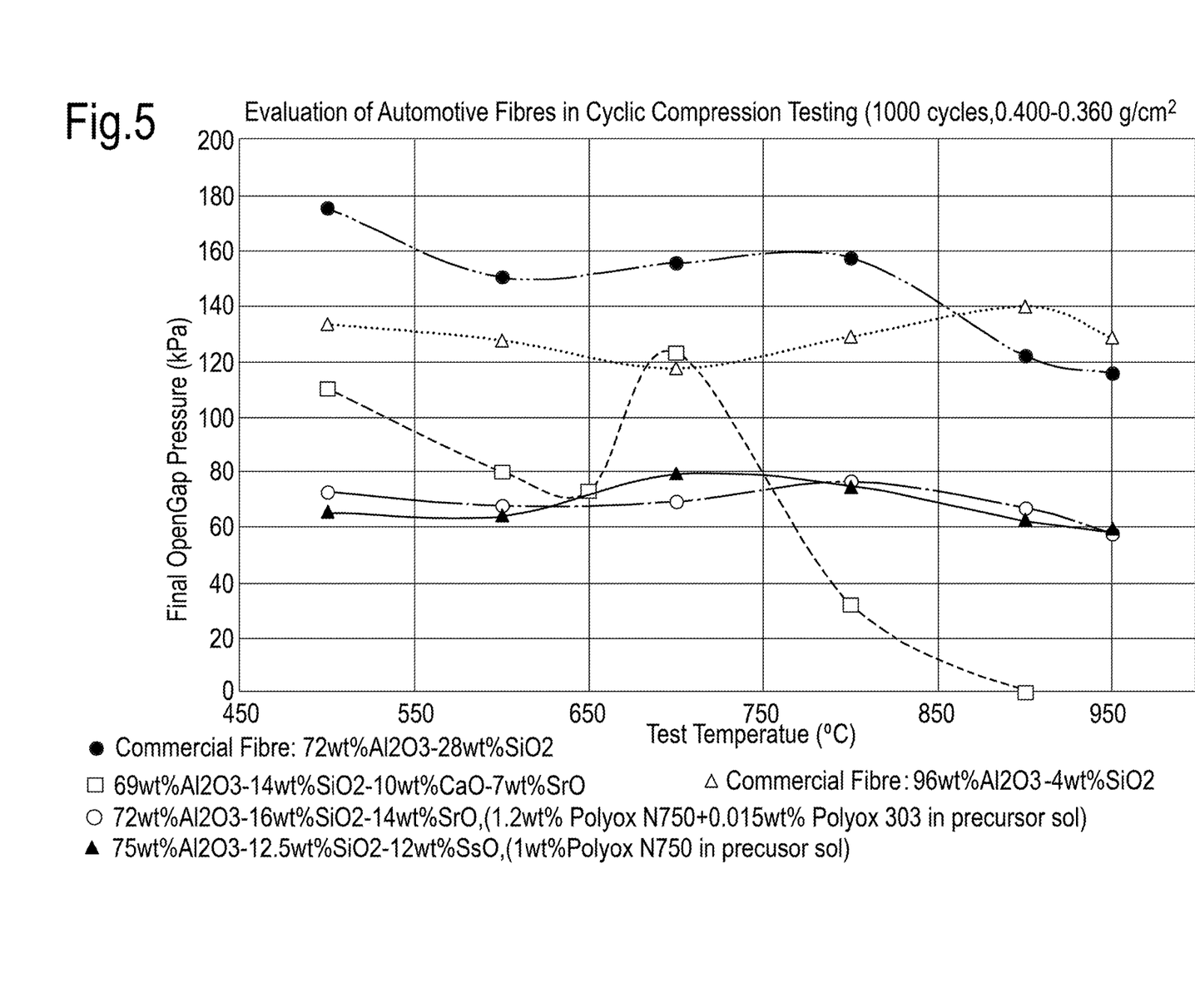
FIG. 5 depicts results from cyclic compression tests of comparative fibres and some fibres according to the present invention.

FIG. 5 depicts compression test performances, with cycles taking place at 0.36 to 0.4 g/cm³. Fibres tested include two fibres according to the present invention and three different types of comparative fibre—a fibre sold under the Maftec® range comprising 72 wt % alumina, 28 wt % silica, a fibre sold by Saffil® under their Ecoflex® range comprising 96 wt % alumina and 4 wt % silica, and a "650° C. Low Bio" fibre according to our previous application GB2534410 with composition 69 wt % alumina, 14 wt % silica, 10 wt % CaO and 7 wt % SrO. The first fibre type according to the present invention depicted are fibres prepared as per sample P36-1449, prepared from a sol containing 1.2 wt % PEO (MW: 300 000)® and 0.015 wt % PEO (MW: 7 000 000)®, with precursors added in proportions to produce a fibre comprising 72 wt % alumina, 14 wt % silica, and 14 wt % SrO. The second fibre type according to the present invention tested are fibres prepared as per sample P36-1502, prepared from a sol containing 1 wt % PEO (MW: 300 000)®, with precursors added in proportions to produce a fibre comprising 75 wt % alumina, 12.5 wt % silica, and 12.5 wt % SrO.

Figure 6:
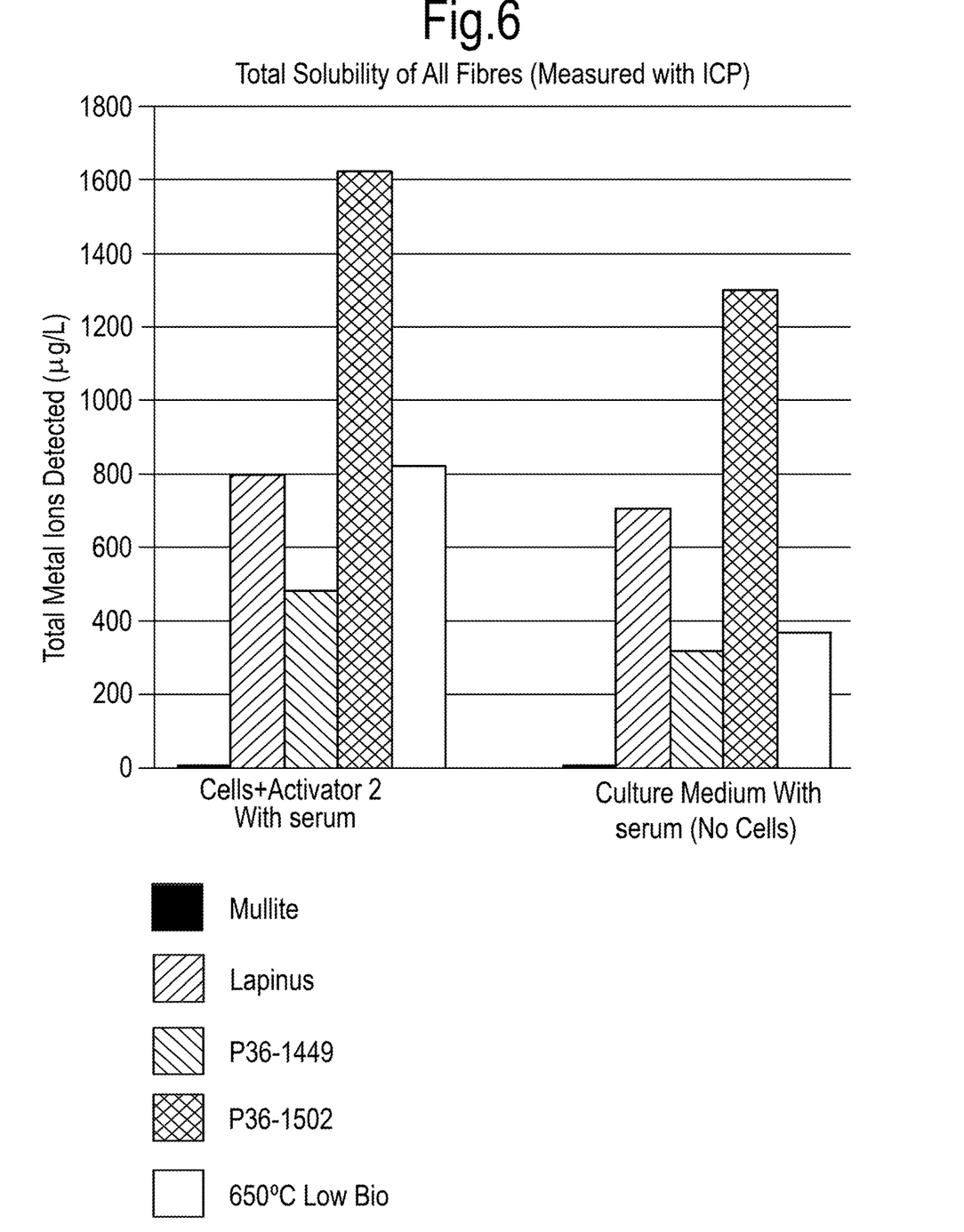
FIG. 6 depicts results of solubility tests of comparative fibres and some fibres according to the present invention.

It will readily be seen that the Maftec® and Saffil® fibres, whilst strong, have a highly variable performance at different temperatures. The 650° C. Low Bio fibre has an extremely erratic performance above a certain temperature, and indeed at around 900° C. simply fails completely. Conversely, the fibres according to the present invention offer a broadly consistent performance across the temperature range tested. FIG. 6 depicts the results of tests conducted with the two fibres according to the present invention outlined above and some comparative fibres. The comparative fibres used were a mullite fibre, a commercially available fibre from Lapinus® sold under the brand name Lapinus MS615 ®-Roxul 1000, comprising approximately 18 wt % alumina, 43 wt % silica, 21 wt % CaO, 7 wt % MgO, 7 wt % $Fe_2O_3$ and various other oxides at compositions less than 2 wt % each, and the "650° C. Low Bio" fibre described above.

The macrophage tests took place using U-937 cells from the American Type Culture Collection (CRL-1593, LGC Promochem, Molsheim, France), be cultured at 37° C. with 5% $CO_2$ in RPMI 1640 medium supplemented with glucose (4.5 g/l), 10 mM HEPES ([7365-45-9], Institute Jacques Boy, Reims, France), 1 mM sodium pyruvate (GIBCO Invitrogen®), 10% foetal calf serum deactivated by heating, 8 mg/l of Amikacin ([37517-28-5], Merck Generics, Lyon, France), 64 mg/l of Amoxicillin ([26787-78-0], GlaxoSmithKline, Marly Le Roy, France) and 2.5 mg/l of Amphotericin B ([1397-89-3], Bristol-Myers Squibb, Rueil Malmaison, France). This was the complete medium.

The activator used in the tests was *E. coli* strain 25922, the American Type Culture Collection (LGC Promochem).

Ten ml of complete RPMI 1640 culture medium containing approximately $1 \times 10^7$ cells were incubated under the conditions indicated above for 2 days. After centrifugation (700 g, 10 min) at room temperature the cell pellet was re-suspended in 10 ml complete medium. The experiment was conducted in triplicate. After addition of $3 \times 10^7$ bacteria suspended in complete medium, incubation was be continued for 7 days in the presence of 400 micrograms of each type of fibre per study. After 7 days, the cell pellet containing the cells and fibres obtained by centrifugation as described above, was be re-suspended in 10 ml of freshly prepared complete medium RPMI 1640. After a further 7 days of incubation, the culture was stopped, centrifuged as described above, 10 ml of supernatant was be sent to Limoges Analytic Centre for the determination of Siliceous and Aluminium metal ions (indicative of dissolution of the fibres) by Atomic Emission Spectrometry by Induction (ICP-AES, Perkin-Elmer 2100), after passage through a filter of 0.45 μm syringe mounted on a Minimart (Sartorius, Vivacious, Hanover, Germany).

The pellet, containing the fibres and cells was washed several times, first with complete RPMI 1640 medium and then serum-free medium and then with ultrapure Milli-Q Plus®. The fibres thus washed (of each sample) were be re-suspended in 10 ml of water and sent for treatment.

It will be immediately evident that under the conditions of the test the mullite fibre did not dissolve any appreciable extent. Conversely, all the other fibres tested dissolved to an extent, with P36-1502 by far dissolving the most.

Taken in conjunction with FIG. 5, it will be evident that fibres according to the present invention can, with suitable optimisation, simultaneously provide a consistently good response in cyclic compression tests over a broad range of temperatures and attain a good level of biosolubility.

Flow Through Tests

TABLE 8

Summary of flow through test results for selected fibres.

| | Chemistry | | | | Flow Through Test Data | | | 900° C. Cyclic Compression - |
| --- | --- | --- | --- | --- | --- | --- | --- | --- |
| | | | | | Dissolution | Mass Lost During Test | Static | Final Open Gap Pressure |
| Sample Number | $Al_2O_3$ [wt %] | $SiO_2$ [wt %] | SrO [wt %] | CaO [wt %] | Rate [ng/cm²/hr] | [% of starting weight] | Solubility [ppm] | (0.368 g/cm3) [kPa] |
| P06-2770 (comparative) | 72 | 28 | 0 | 0 | 0.1 | 0.3 | 0 | 116 |
| P36-1449 | 72 | 14 | 14 | 0 | 160.7 | 26.8 | 94 | 82 |
| P36-1502 | 72 | 12.5 | 12.5 | 0 | 312.9 | 38.9 | 172 | 55 |

As outlined above, flow through solubility measurements were made in accordance with the procedure set out in WO2008/065363, save that the test proceeded for 24 hours instead of 5 hours due to the lower solubility of the fibres involved. Table 8 below depicts the results of such tests on P36-1449 and P36-1502 (as outlined above), along with results from static solubility and cyclic compression tests on the same, along with results for the tests on P06-2770, a comparative sample representative of existing sol-gel fibres on the market (a standard aluminosilicate which is not low-biopersistent.) It is expected from previous testing that a dissolution rate of at least 150 ng/cm²/hr is required for a fibre to meet the 40 day half-life requirement for exoneration in an intratracheal test.

Fibres Containing CaO or MgO

TABLE 9

Test results compared with fibres containing MgO or CaO.

| Sample | Al₂O₃ (wt %) | SiO₂ (wt %) | SrO (wt %) | CaO (wt %) | MgO (wt %) | Firing Temperature (° C.) | Shot Content (wt %) | Static Solubility [ppm] | 900° C. Cyclic Compression - Final Open Gap Pressure (0.368 g/cm3) [kPa] |
|---|---|---|---|---|---|---|---|---|---|
| 248 (C) | 70 | 13 | 7 | 10 | 0 | 1100 | 1.1 | 106 | 0 |
| 275 (C) | 73 | 14 | 7 | 6 | 0 | 1100 | 3.4 | 86 | 15 |
| 1113 (C) | 75 | 10 | 10 | 5 | 0 | 1100 | 0.06 | 80 | 17 |
| 1057 (C) | 70 | 15 | 5 | 5 | 5 | 1100 | 1.7 | 44 | Not tested |
| 1062 (C) | 70 | 15 | 5 | 0 | 10 | 1100 | 1.6 | 31 | Not tested |
| 1063 | 70 | 15 | 10 | 0 | 5 | 1100 | 1.7 | 35 | 38 |
| 1089 (C) | 75 | 10 | 5 | 5 | 5 | 1100 | 0.4 | 94 | 17 |
| 1121 | 75 | 10 | 10 | 0 | 5 | 1100 | 0.2 | 205 | 21 |
| 1123 (C) | 75 | 10 | 5 | 0 | 10 | 1100 | 0.5 | 30 | Not tested |
| 1131 (C) | 65 | 20 | 15 | 0 | 0 | 1100 | 0.5 | 10 | Not tested |
| 1147 (C) | 65 | 20 | 10 | 0 | 5 | 1100 | 0.2 | 10 | 1 |
| 1149 (C) | 65 | 20 | 10 | 5 | 0 | 1100 | 0.1 | 34 | 45 |
| 1249 (C) | 61.2 | 23.8 | 15 | 0 | 0 | 1100 | 1.1 | 14 | 35 |
| 1240 (C) | 61.2 | 23.8 | 10 | 0 | 5 | 1100 | 1.4 | 14 | 0 |
| 1247 (C) | 61.2 | 23.8 | 10 | 5 | 0 | 1100 | 1.6 | 21 | 49 |
| 1238 (C) | 61.2 | 23.8 | 5 | 10 | 0 | 1100 | 0.9 | 54 | 45 |
| 1242 (C) | 61.2 | 23.8 | 5 | 0 | 10 | 1100 | 2.6 | 9 | 0 |
| 1449 | 72 | 14 | 14 | 0 | 0 | 1150 | 1.14 | 94 | 82 |
| 1590 | 72 | 14 | 12 | 0 | 2 | 1150 | 0.73 | 144 | 45 |
| 2210 | 72 | 14 | 12 | 2 | 0 | 1150 | 0.80 | 84 | 35 |
| 1502 | 75 | 12.5 | 12.5 | 0 | 0 | 1150 | 1.35 | 172 | 55 |
| 1591 | 75 | 12.5 | 10 | 0 | 2.5 | 1150 | 1.11 | 176 | 29 |
| 2212 | 75 | 12.5 | 10.5 | 2 | 0 | 1150 | 1.87 | 140 | 32 |

Table 9 compares the performance of samples according to the present invention with various comparative examples (denoted with a "(C)" after their sample number listing in the table). Samples 248 and 275 are prior art samples from previous application GB2534410 and include both strontia and calcia. Sample 1113 is an additional comparative example containing both strontia and calcia, but with levels of other components in keeping with the present invention. It is evident from the table that all three of these comparative samples perform unacceptably poorly in the cyclic compression tests at 900° C., with even 5 wt % CaO being sufficient to render the sample unable to perform as well as fibres according to the present invention. It is also evident that both samples 275 and 1113 have poor solubility results as well.

Samples 1449 and 1502 are samples according to the present invention including effectively no calcia, which is preferred; it is evident from both formulations that excellent results in both the solubility tests and the cyclic compression tests are attained.

Samples 1590 and 1591 are presented to test the tolerance of fibres according to the present intention for the inclusion of MgO; 1590 takes the formula of 1449 and substitutes some of the strontia for magnesia, whilst 1591 takes the formula of 1502 and likewise substitutes some of the strontian for magnesia. In both cases, the result is a significant decline in the cyclic compression results—though still better than the prior art—and no particular detriment to solubility (in fact, in the case of 1590 a clear enhancement of solubility is indicated). The inclusion of MgO may therefore yield acceptable results, especially in applications where it is acceptable to trade off some mechanical properties in favour of greater solubility. (An extreme example is found with samples 1063 and 1121, in which a small adjustment of the proportions of other ingredients can yield a very high solubility but mechanical performance is limited.) In general, whilst fibres according to the present invention can contain MgO, for most purposes it is preferable that the amount of MgO is equal to or less than 4 wt %, preferably equal to or less than 2 wt %, preferably 0 wt %.

Samples 2210 and 2212 are presented to test the tolerance of fibres according to the present intention for the inclusion of CaO; 2210 takes the formula of 1449 and substitutes some of the strontia for calcia, whilst 2212 takes the formula of 1502 and likewise substitutes some of the strontia for calcia. In both cases, considering the poor performance of prior art calcia-containing fibres, the calcia content is kept below 4 wt %. In both cases, the result is a significant decline in the cyclic compression and solubility testing results—though still better than the prior art. Preferably, the amount of calcia in the fibre of the present invention is equal to or less than 2 wt %. More preferably, it is 0 wt %. The various comparative examples that combine 61.2 wt % alumina and 23.8 wt % silica are intended to demonstrate the effect of adding alkali earth metal oxides to existing commercial fibres on the market with a 72:28 ratio of alumina to silica; as can be seen, the solubility results tend to be poor, and as such merely adding alkali earth metal oxides to such fibres would not be expected to lead to the present invention.

Manufacturing Processes Involving a Tunnel Kiln

Sol gel fibres according to the present invention may be produced utilising a production line process incorporating a tunnel kiln for firing the fibres after formation. In such a process, the fibres are collected after fiberisation on a moving belt at the bottom of a woolbin. When the fibres exit the belt, they form a fleece approximately uniform in thickness and mass per unit area. In a production environment, it is preferable to transfer the fleece directly through a tunnel kiln to crystallise as an automatic, continuous process. The fleece is driven through a tunnel kiln, heated by electric elements, on ceramic rollers in a continuous fashion such that the fibre decomposes (i.e. organics and water from the sol are driven off), densities and eventually crystallises to form a fibre with similar properties to those fired inside a standard kiln.

The fibre can be driven through the tunnel kiln at a controllable rate in order to achieve the desired properties. For example, a preferred profile of the kiln brings the fibre to 1225° C. in 1 hr 18 minutes, at which point the temperature is maintained around 1225° C. for 19 minutes before exiting the kiln after a total firing time of 1 hr 51 minutes. The optimum temperature of the kiln is different to that of the laboratory kiln due to differences in the environment and the amount of time at which the fleece can be maintained at the desired temperature. Furthermore, the thermal history of the final crystallised fibre is altered when the fibre is fired through a tunnel kiln.

Potential Uses

The fibres of the present invention can be used, subject to meeting relevant performance criteria, for any purpose for which fibrous inorganic materials, and particularly alkaline earth silicate and aluminosilicate materials, have been used heretofore; and may be used in future applications where the fibre properties are appropriate.

In the following reference is made to a number of patent documents relating to applications in which the fibres may be used, subject to meeting relevant performance criteria for the application. The fibres of the present invention can be used in place of the fibres specified in any of these applications subject to meeting relevant performance criteria.

For example, the fibres may be used as:—
bulk materials;
deshotted materials [WO2013/094113];
in a mastic or mouldable composition [WO2013/080455, WO2013/080456] or as part of a wet article [WO2012/132271];
as a constituent in needled or otherwise entangled [WO2010/077360, WO2011/084487] assemblies of materials, for example in the form of blanket, folded blanket modules, or high density fibre blocks [WO2013/046052];
as a constituent of non-needled assemblies of materials, for example felts, vacuum formed shapes [WO2012/132469], or papers [WO2008/136875, WO2011/040968, WO2012/132329, WO2012/132327];
as a constituent (with fillers and/or binders) of boards, blocks, and more complex shapes [WO2007/143067, WO2012/049858, WO2011/083695, WO2011/083696];
as strengthening constituents in composite materials such as, for example, fibre reinforced cements, fibre reinforced plastics, and as a component of metal matrix composites;
in support structures for catalyst bodies in pollution control devices such as automotive exhaust system catalytic converters and diesel particulate filters [WO2013/015083], including support structures comprising:
edge protectants [WO2010/024920, WO2012/021270];
microporous materials [WO2009/032147, WO2011019394, WO2011/019396];
organic binders and antioxidants [WO2009/032191];
intumescent material [WO2009/032191];
nanofibrillated fibres [WO2012/021817];
microspheres [WO2011/084558];
colloidal materials [WO2006/004974, WO2011/037617]
oriented fibre layers [WO2011/084475];
portions having different basis weight [WO2011/019377];
layers comprising different fibres [WO2012065052];
coated fibres [WO2010122337];
mats cut at specified angles [WO2011067598];
[NB all of the above features may be used in applications other than support structures for catalytic bodies]
in the form of an end cone [e.g. U.S. Pat. Nos. 6,726,884, 8,182,751]
as a constituent of catalyst bodies [WO2010/074711];
as a constituent of friction materials [e.g. for automotive brakes [JP56-16578]];
for fire protection [WO2011/060421, WO2011/060259, WO2012/068427, WO2012/148468, WO2012/148469, WO2013074968]; and optionally in combination with one or more intumescent materials, endothermic materials, or both intumescent and endothermic materials
as insulation, for example;
as insulation for ethylene crackers [WO2009/126593], hydrogen reforming apparatus [U.S. Pat. No. 4,690,690];
as insulation in furnaces for the heat treatment of metals including iron and steel [U.S. Pat. No. 4,504,957];
as insulation in apparatus for ceramics manufacturing.

The fibres may also be used in combination with other materials. For example the fibres may be used in combination with polycrystalline (sol-gel) fibres [WO2012/065052] or with other biosoluble fibres [WO2011/037634].

Bodies comprising the fibres may also be used in combination with bodies formed of other materials. For example, in insulation applications, a layer of material according to the present invention [for example a blanket or board] may be secured to a layer of insulation having a lower maximum continuous use temperature [for example a blanket or board of alkaline earth silicate fibres] [WO2010/120380, WO2011133778]. Securing of the layers together may be by any known mechanism, for example blanket anchors secured within the blankets [US4578918], or ceramic screws passing through the blankets [see for example DE3427918-A1].

Treatment of the Fibres

In formation of the fibres or afterwards they may be treated by applying materials to the fibres.

For example:—
lubricants may be applied to the fibres to assist needling or other processing of the fibres;
coatings may be applied to the fibres to act as binders;
coatings may be applied to the fibres to provide a strengthening or other effect, for example phosphates [WO2007/005836] metal oxides [WO2011159914] and colloidal materials such as alumina, silica and zirconia [WO2006/004974];
binders may be applied to the fibres to bind the fibres subsequent to incorporation in a body comprising such fibres.

Many variants, product forms, uses, and applications of the fibres of the present invention will be apparent to the person skilled in the art and are intended to be encompassed by this invention.

By providing biosoluble fibres having improved mechanical properties and solubility over the fibres of WO2007054697, the present invention extends the range of applications for which biosoluble fibres may be used. This reduces the present need, for many applications, to use fibres that are not biosoluble.

The invention claimed is:

1. Inorganic fibers having a composition comprising:
   $70 \leq Al_2O_3 \leq 80$ wt %;
   $10 \leq SiO_2 \leq 20$ wt %;
   $10 \leq SrO \leq 20$ wt %; and
   $0 \leq CaO < 4$ wt %,
   wherein the sum of $Al_2O_3$, $SiO_2$ and SrO is at least 90 wt %.

2. The inorganic fibers according to claim 1, wherein the composition comprises: $Al_2O_3 \leq 77.5$ wt %.

3. The inorganic fibers according to claim 1, wherein the composition comprises: $Al_2O_3 \geq 72$ wt %.

4. The inorganic fibers according to claim 1, wherein the inorganic fibres composition comprises: $CaO \leq 2$ wt %.

5. The inorganic fibers according to claim 4, wherein the composition comprises: 0 wt % CaO.

6. The inorganic fibers according to claim 1, wherein the composition comprises: $MgO \leq 4$ wt %.

7. The inorganic fibers according to claim 6, wherein the composition comprises: 0 wt % MgO.

8. The inorganic fibers according to claim 1, wherein the total addition of oxides of alkali earth metals is $\leq 20$ wt %.

9. The inorganic fibers according to claim 1, wherein the sum of $Al_2O_3$, $SiO_2$ and SrO is at least 92 wt %.

10. The inorganic fibers according to claim 1, wherein the composition comprises:
    $72 \leq Al_2O_3 \leq 80$ wt %;
    $10 \leq SiO_2 \leq 15$ wt %;
    $10 \leq SrO \leq 15$ wt %.

11. The inorganic fibers according to claim 10, wherein the composition comprises:
    $72 \leq Al_2O_3 \leq 77.5$ wt %;
    $11 \leq SiO_2 \leq 15$ wt %;
    $12.5 \leq SrO \leq 15$ wt %; and
    $0 \leq CaO < 4$ wt %.

12. The inorganic fibers according to claim 1, wherein the composition comprises:
    $Al_2O_3 = 72.0 \pm 1.0$ wt %;
    $SiO_2 = 14.0 \pm 1.0$ wt %; and
    $SrO = 14.0 \pm 1.0$ wt %.

13. The inorganic fibers according to claim 1, wherein the inorganic fibers have a static biosolubility level of at least 20 ppm and a cyclic compression measured at 900° C. of at least 20 kPa.

14. The inorganic fibers, as claimed in according to claim 1, in which the fibers have a shot content of less than 1.5 wt %.

15. Automobiles and components for automobiles or automotive applications comprising the inorganic fibers of claim 1.

16. The inorganic fibers of claim 1 having a static biosolubility level of at least 20 ppm and a cyclic compression measured at 900° C. of at least 20 kPa in automotive applications.

* * * * *